(12) United States Patent
Hemphill et al.

(10) Patent No.: US 10,998,771 B2
(45) Date of Patent: May 4, 2021

(54) WIRELESS POWER TRANSMITTER, WIRELESS POWER TRANSMISSION SYSTEM AND METHOD FOR DRIVING A WIRELESS POWER TRANSMISSION SYSTEM

(71) Applicant: TDK Electronics AG, Munich (DE)

(72) Inventors: Hugh Hemphill, Solothurn (CH); Noritaka Chiyo, Solothurn (CH)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/347,157

(22) PCT Filed: Nov. 2, 2016

(86) PCT No.: PCT/EP2016/076451
§ 371 (c)(1),
(2) Date: May 2, 2019

(87) PCT Pub. No.: WO2018/082769
PCT Pub. Date: May 11, 2018

(65) Prior Publication Data
US 2020/0227945 A1    Jul. 16, 2020

(51) Int. Cl.
*H02J 50/12* (2016.01)
*H02J 50/40* (2016.01)
*H04B 5/00* (2006.01)

(52) U.S. Cl.
CPC ............ *H02J 50/12* (2016.02); *H02J 50/402* (2020.01); *H04B 5/0037* (2013.01)

(58) Field of Classification Search
CPC ........ B60L 11/00; B60L 11/182; H01F 38/00; H01F 38/14; H02J 17/00; H02J 5/00;
(Continued)

(56) References Cited

U.S. PATENT DOCUMENTS

| 1,669,031 A | 5/1928 | Willis |
| 9,231,411 B2 | 1/2016 | Baarman et al. |

(Continued)

FOREIGN PATENT DOCUMENTS

| EP | 2983266 A | 2/2016 |
| JP | 2016039773 A | 3/2016 |

(Continued)

*Primary Examiner* — Lincoln D Donovan
*Assistant Examiner* — Dave Mattison
(74) *Attorney, Agent, or Firm* — Slater Matsil, LLP (57) ABSTRACT

A wireless power transmitter, a power transmission system and a method for driving a wireless power transmitter are disclosed. In an embodiment, a wireless power transmitter includes an inverter, an impedance circuit, an inductance circuit including a first transmission coil and a second transmission coil and a switch circuit, wherein the impedance circuit and the inductance circuit are configured to establish a resonance circuit, wherein the inverter is configured to provide AC power to the resonance circuit, and wherein the switch circuit is configured to couple the first transmission coil and/or the second transmission coil to the impedance circuit to change a resonance frequency of the resonance circuit and to keep a frequency of the AC power within a prescribed range.

18 Claims, 4 Drawing Sheets

(58) Field of Classification Search
CPC .. H02J 5/005; H02J 50/00; H02J 50/12; H02J 50/402; H02J 7/00; H02J 7/025; H04B 5/00; H04B 5/0037
USPC .......................................................... 307/104
See application file for complete search history.

(56) References Cited

U.S. PATENT DOCUMENTS

| | | | |
|---|---|---|---|
| 2009/0230777 A1* | 9/2009 | Baarman | H02J 5/005 307/104 |
| 2011/0169337 A1 | 7/2011 | Kozakai | |
| 2012/0025623 A1 | 2/2012 | Low et al. | |
| 2012/0062203 A1 | 3/2012 | Kim | |
| 2012/0091950 A1 | 4/2012 | Campanella et al. | |
| 2015/0236513 A1* | 8/2015 | Covic | H02J 7/025 307/104 |
| 2016/0043567 A1 | 2/2016 | Matsumoto et al. | |

FOREIGN PATENT DOCUMENTS

| | | |
|---|---|---|
| WO | 2009114671 A | 9/2009 |
| WO | 2013122483 A1 | 8/2013 |

\* cited by examiner

WIRELESS POWER TRANSMITTER, WIRELESS POWER TRANSMISSION SYSTEM AND METHOD FOR DRIVING A WIRELESS POWER TRANSMISSION SYSTEM

This patent application is a national phase filing under section 371 of PCT/EP2016/076451, filed Nov. 2, 2016 which is incorporated herein by reference in its entirety.

TECHNICAL FIELD

The present invention refers to wireless power transmitters, e.g., transmitters that can be utilized in a wireless power transmission system, and two methods for driving a wireless power transmission system. In particular, the present invention refers to wireless power transmitters for improved power transmission to a wireless power receiver.

BACKGROUND

Wireless power transmitters and wireless power transmission systems can be utilized to transfer electric power toward a device without the need for physical connection. E.g., handheld devices such as mobile communication devices or automobiles can be provided with electric power via such transmitters and transmission systems.

An intrinsic problem of wireless power transmission systems is that generally not reproducible arrangement of the power transmitter relative to the power receiver. E.g., if a power transmitter is utilized to transmit electric power to an automobile having a power receiver, then deviations in lateral and horizontal distances and in orientations are practically unavoidable. However, deviations in the distance between the transmitter and the receiver cause changes of the inductance of the transmission system, and changes to the magnetic coupling between the transmission system and the receiver system, leading to increased current losses and a decreased efficiency.

From Patent Application No. US 2012/0025623 A1 inductive power receiver is known. From International Application No. WO 2009/114671 A1 inductive power supply systems are known.

SUMMARY OF THE INVENTION

Embodiments provide power transmitters and power transmission systems with reduced current losses, increased efficiency and an improved reliability but without the need for additional space and with an easily performable control system. Further embodiments provide systems supporting interoperability, i.e., a cooperation of different power transmitters with different power receivers in a plurality of different environments and relative arrangements between transmitter and receiver.

A wireless power transmitter according to embodiments comprises an inverter, an impedance circuit, an inductance circuit with a first transmission coil and a second transmission coil. Further, the wireless power transmitter comprises a switch circuit. The impedance circuit and the inductance circuit establish a resonance circuit. The inverter provides AC power to the resonance circuit. The switch circuit can couple the first transmission coil and/or the second transmission coil to the impedance circuit to change a resonance frequency of the resonance circuit and to keep a frequency of the AC power within a prescribed range.

The inverter of the wireless power transmitter acts as the power source. The inverter receives electric power from an external circuit environment. The power received from the environment can be electric power provided with a conventional frequency of, e.g., 50 Hz or 60 Hz. Specifications that need to be fulfilled may be the limitation of the operation frequency of the inverter to a certain frequency range that may comprise frequencies between 81 and 90 kHz. The inverter can comprise an H-bridge circuit for transforming electric power of low frequency, e.g., DC power, to electric power of the abovementioned frequency range. The H-bridge circuit for generating AC power is the element of which the operation frequency is changed to maintain a frequency within the above mentioned frequency range.

The inductance circuit can comprise further transmission coils. The transmission coils of the inductance circuit can be of different types. Each of the first and the second transmission coil and possibly further transmission coils can be a single-spiral type coil or a double-spiral type coil, for instance. A double-spiral type coil comprises two coil segments arranged one next to another. The two coil segments of a double-spiral type coil may be electrically connected in series and work together to give the coupling magnetic field a preferred shape with reduced field strength at unwanted positions.

Thus, it is possible that the transmission coils of the inductance circuit are selected from a single-spiral coil and a double-spiral type coil.

It was found that variations in distance between a power transmitter and a wireless power receiver or variations in the orientation of wireless power receiver relative to the wireless power transmitter not only lead to reduced power transfer efficiency but also to a change of resonance frequency of the resonance circuit. While a reduction in transmission efficiency is generally unwanted but acceptable, if the efficiency is not reduced too much, a frequency variation shifting the operation frequency of the inverter out of the above mentioned frequency range may not be acceptable. The above mentioned wireless power transmitter has the ability to keep the operation frequency within the above mentioned allowed frequency range as the transmitter has at least two transmission coils and the ability to change the resonance frequency of the resonance circuit. The switch circuit can couple the first transmission coil to the impedance circuit resulting in a resonance circuit with the first resonance frequency. Further, the switch circuit can couple the second transmission coil instead of the first transmission coil to the impedance circuit to provide a resonance circuit with a second resonance frequency. The second resonance frequency can be different from the first resonance frequency. If it is found that the operation frequency of the inverter providing the AC power to the two coils cannot keep the operation frequency within the allowed frequency range then the respective other transmission coil can be used instead to shift the operation frequency towards the allowed frequency range. Furthermore, if the first transmission coil and the second transmission coil have different geometries, for example, inside and outside diameters, then it becomes possible to change the magnetic coupling between the transmission system and the receiver system by changing the position of the switch.

Thus, with the present wireless power transmitter a resonance circuit is provided that allows to change the resonance frequency in order to comply with frequency demands or to modify the coupling factor to improve overall efficiency.

The switch circuit can provide a mode of operation where only the first transmission coil is electrically connected to the impedance circuit. Further, the switch circuit can provide an operation mode where only the second transmission coil is electrically connected to the impedance circuit. The wireless power transmitter can comprise further transmission coils, and for each transmission coil the switch circuit can provide a mode of operation where the respective transmission coil is exclusively connected to the impedance circuit to obtain a resonance circuit with optimal resonance frequency and magnetic coupling factor.

However, the switch circuit can be provided in such a way that it simultaneously connects two or more transmission coils to the impedance circuit. Then, the number of operation modes is vastly increased.

The impedance circuit comprises an impedance element that may be selected from one or more capacitive elements and/or from one or more inductive elements or from a network comprising capacitive and inductive circuit elements. The circuit elements of the impedance circuit can be chosen such that their impedance together with the active transmission coil of the inductive circuit establishes a resonance circuit with an appropriate resonance frequency.

It is possible that the switch circuit can couple the first transmission coil parallel to or in series with a second transmission coil.

The vast number of different modes of operation when several transmission coils are present is further increased by the fact that a transmission coil or a group of transmission coils can either be electrically connected in parallel or in series to another transmission coil or to another group of transmission coils.

It is possible that the switch circuit can couple one transmission coil to the impedance circuit while the respective other transmission coil is separated from the impedance circuit. For example, if the first transmission coil is electrically connected to the impedance circuit, then the second transmission coil—and the respective other transmission coils if present—are decoupled from the impedance circuit.

Operation modes where only one transmission coil selected from the transmission coils of the inductance circuit is a part of a resonance circuit is preferred because electromagnetic interaction between different active transmission coils is reduced.

It is possible that the switch circuit comprises a first switch and a second switch and that each of the first transmission coil and the second transmission coil is coupled between the first switch and the second switch.

Such a switch circuit can have the first switch electrically connected to a first electrode of the first transmission coil, to a first electrode of the second transmission coil and to one port of the impedance circuit. The switch circuit further can have the second switch electrically connected to a second electrode of the first transmission coil, to a second electrode of the second transmission coil, and to a second port of the impedance circuit. The first switch can selectively connect the first port of the impedance circuit either to the first electrode of the first transmission coil or to the first electrode of the second transmission coil. Additionally, the second switch can electrically connect the second port of the impedance circuit to either the second electrode of the first transmission coil or to the second electrode of the second transmission coil. Of course, if the wireless power transmitter has more than two transmission coils, then the respective switch can comprise one common terminal and more than two selectable terminals. The common terminal connects to a port if the impedance circuit. The selectable terminals connect to the respective transmission coil. The respective switch can connect the common terminal to any one of the selectable terminals.

Further, the switch circuit can comprise further switches to establish an electrical connection between different transmission coils to provide operation modes where more than one transmission coil is active.

It is possible that the impedance circuit comprises a first capacitive element and a second capacitive element. The two capacitive elements are coupled to the first switch and to the second switch, respectively.

In particular, it is possible that the first capacitive element can be electrically connected between the first port of the impedance circuit and the inverter. The second capacitive element can be electrically connected between the second port of the impedance circuit and the inverter. Then, the wireless power transmitter can provide operation modes where either the first transmission coil or the second transmission coil is electrically connected in series between the two capacitive elements.

If the wireless power transmitter comprises more than two transmission coils, then for each transmission coil the switch circuit can comprise one mode of operation where the respective transmission coil is electrically connected in series between the first capacitive element and the second capacitive element.

Accordingly, it is possible, that the wireless power transmitter has a first and a second switch in the switch circuit and a first and a second capacitor in the impedance circuit while having two or more transmission coils in the inductance circuit. The switch circuit can electrically connect the first transmission coil in series between the first capacitive element and the second capacitive element or the second transmission coil in series between the first capacitive element and the second capacitive element.

As the transmission coils need to be aligned and arranged relative to the corresponding wireless power receiver, space for integrating the transmission coils is limited because all the transmission coils should be positioned at a similar position to act efficiently on the receiver. Thus, although a larger number of transmission coils allows a vast number of different operation modes, the number of transmission coils cannot be chosen arbitrarily. A detailed analysis of the inventor had the result that a wireless power transmitter comprising only two transmission coils already allows a limitation to a preferred frequency range in situations where sufficient large deviations of transmitter to receiver distances or alignment angles are present.

It is possible that the impedance circuit is electrically connected between the switch circuit and the inverter. The switch circuit is electrically connected between the inductance circuit and the impedance circuit.

Thus, the switch circuit and the impedance circuit are electrically connected between the inductance circuit comprising the transmission coils and the inverter. Via the switch circuit the elements of the impedance circuit and the elements (in particular, the transmission coils) of the inductance circuit establish the resonance circuit of which a resonance frequency can be easily shifted in response to the situations.

The wireless power transmitter can comprise a control circuit that has an IC chip which is electrically coupled to the switch circuit. Further, the wireless power transmitter can comprise circuit elements for monitoring central power transmission parameters such as voltages applied to the inductance circuit, currents provided to the inductance circuit, phase angles between a transmitted signal and a reflected signal and of course frequencies such as operation frequencies. The wireless power transmitter can have the monitoring circuits and the IC circuit in a control loop to adaptively shift the operation frequencies back to an allowed frequency range.

It is possible that the first and the second transmission coil are concentrically wound. In particular, it is possible that the two coils are concentrically wound in essentially the same plane. The start, or finish, of the coil winding for the transmission coil one can be at a different location than the start, or finish, of the transmission coil.

As already stated above, the space for arranging the transmission coils is restricted and concentrical windings allow geometric dimensions that do not significantly deviate from the diametric dimensions of conventional power transmission coils.

In particular, it is possible that the windings of the transmission coils are interleaved.

It is possible that the number of turns of the first transmission coil is larger than the number of turns of the second transmission coil.

If the number of windings of the first transmission coil is larger than the number of windings of the second transmission coil and if the same type of wire for the transmission coils is used, then the first transmission coil will usually have the larger inductance.

Different transmission coils having different inductances are preferred if the transmission coils are exclusively coupled to the impedance circuit and exclusively driven in a mode of operation. If modes of operations are utilized with more than one active transmission coil, then equal inductances (providing simple control algorithms) or inductances where the next larger inductance is doubled in value can be preferred as transmission coils with inductance values $2^0 L_0$, $2^1 L_0$, $2^2 L_0$, $2^3 L_0$, . . . allow covering the inductivity range equidistantly in a simple manner.

It is possible that the wire of the first and/or the second transmission coil is a litz wire. In litz wires a plurality of isolated wire strands individually isolated from one another are combined to reduce losses caused by the skin effect.

It is possible that the wireless power transmitter further comprises a sheet with a ferrite material. This ferrite sheet may be arranged below a coil layer comprising the first transmission coil and the second transmission coil.

This ferrite sheet maybe used to form the shape of a magnetic field emitted by the transmitter. To obtain a high transmission efficiency the magnetic field should be directed towards the receiver which may be arranged below or above the wireless power transmitter. If the receiver is arranged above the transmitter, then it is preferred that the amount of magnetic field emitted in a direction below the transmitter is reduced to a minimum. The ferrite sheet can, thus, help increasing the transmitter's efficiency by preventing a magnetic field distribution at locations too far away from the receiver.

Further, it is possible that the wireless power transmitter has a dielectric sheet comprising a dielectric material. The dielectric sheet can be arranged between the coil layer and the ferrite sheet if present.

The dielectric sheet insulates the transmission coil from the material of the ferrite sheet.

The ferrite sheet can comprise or consist of ferrite bars.

It is further possible that the inductance circuit has a metal sheet comprising a metal. The metal sheet may be arranged below the ferrite sheet.

The metal sheet may comprise aluminum.

Further, it is possible that the wireless power transmitter has an additional dielectric sheet comprising a dielectric material. The additional dielectric sheet may be arranged between the ferrite sheet and the metal sheet.

A wireless power transmission system according to embodiments comprises a wireless power transmitter as described above. Further, the transmission system comprises a wireless power receiver having a reception coil. The reception coil can receive power even if the reception coil and the transmission coils of the inductance circuit are not perfectly arranged relative to each other.

Of course, the wireless power receiver can also comprise a rectifier rectifying electric energy received by the receiver coil and providing a DC power that may be utilized to charge a battery.

It is possible that the transmission coils of the inductance circuit of the transmitter and the reception coils of the power receiver are selected from a single-spiral coil and a double-spiral type coil. Then, interoperability is improved as the transmitter and the receiver can work with single-spiral coils and/or double-spiral type coils.

Such power transmitters, receivers and transmission systems can be used to transfer power of power levels to charge mobile communication system or automobiles or of power levels in between. The power levels can, thus, range from 1 W to 10 kW.

Due to the improved interoperability it is not necessary that transmitter and receiver are from the same manufacturer or from the same manufacturing date. Switchable coils can be on the transmitter side and on the receiver side. The resulting increased flexibility makes it possible that an older receiver can be provided with power from a more modern transmitter and vice versa.

The wireless power receiver may also comprise a ferrite sheet, a metal sheet and a first and/or a second dielectric sheet. It is possible that the ferrite sheet of the wireless power transmitter has a rectangular shape and a length of 600 mm and a width of 500 mm. The ferrite sheet of the receiver can also have a rectangular shape and a length of 300 mm and a width of 290 mm.

The first transmission coil can have 15 turns. The second transmission coil can have 14 turns. The inductance of the first transmission coil can be in a range between 180 and 190 µH. The inductance of the second transmission coil can be in a range between 150 µH and 156 µH. The above described wireless power transmission system can be operated in an allowed frequency range, e.g., in the SAE frequency range, with a power efficiency of 90 percent at a distance between transmission and reception coils of more than 150 mm.

In various embodiments a method for driving a wireless power transmission system comprises selecting one transmission coil from the transmission coils, coupling the selected transmission coil to the impedance circuit, transmitting a first amount of power, determining at least one transmission parameter selected from a voltage, a current, a phase angle, a resonance frequency, decoupling the selected transmission coil from the impedance circuit, coupling the first transmission coil and a second transmission coil coupled to the first transmission coil in series to the impedance circuit, transmitting a second amount of power, determining at least one transmission parameter selected from a voltage, a current, a phase angle, a resonance frequency, and transmitting an amount of power larger than the first and second amount utilizing the transmission coil with the better transmission parameter selected from the transferred power, the transmission efficiency and the operation frequency.

E.g., if the current is selected for monitoring the operation frequency is controlled based on the current.

BRIEF DESCRIPTION OF THE DRAWINGS

The basic operating principles and schematic equivalent circuit diagrams and non-limiting embodiments are shown in the accompanying drawings.

In particular.

DETAILED DESCRIPTION OF ILLUSTRATIVE EMBODIMENTS

Figure 1:
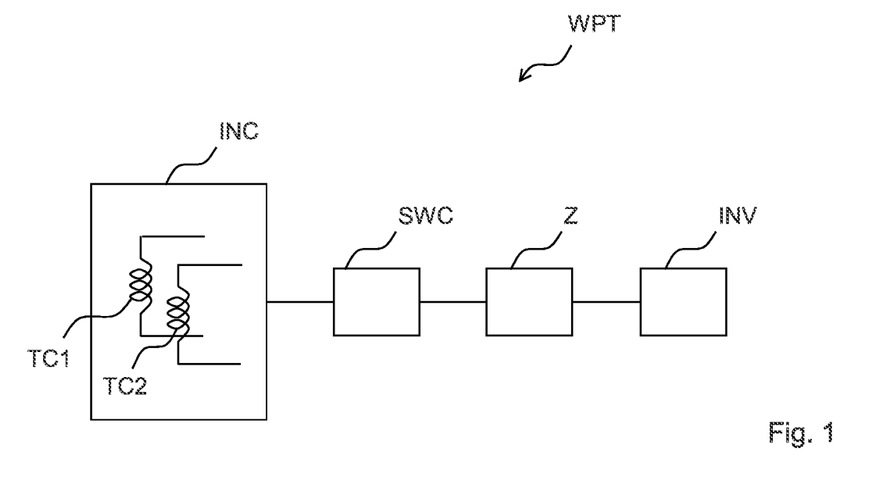
FIG. 1 shows a possible arrangement of the inverter, the impedance circuit, the switch circuit and the inductance circuit.

FIG. 1 shows a basic construction of a wireless power transmitter WPT comprising an inverter INV, an impedance circuit Z, a switch circuit SWC, and an inductance circuit INC. The Inverter INV receives electric power from an external circuit environment and provides the electric power that is to be transmitted to a receiver. The inverter INV provides the electric power at an operation frequency that may be around 85 kHz. The power is transmitted to the impedance circuit Z. The switch circuit SWC electrically connects the inductance circuit INC to the impedance circuit Z. The inductance circuit INC comprises the first transmission coil TC1 and the second transmission coil TC2. The inductance circuit may comprise further transmission coils not shown in FIG. 1. The transmission coils can be wound concentrically. The transmission coils of the inductance INC circuit and circuit elements in the impedance circuit Z establish a resonance circuit to which AC power is provided from the inverter INV. The inverter INV controls the operation frequency of the AC power. As the inductance circuit INC has at least two transmission coils and as the switch circuit SWC comprises the switching possibilities to connect the impedance circuit Z to different inductances of the inductance circuit INC the resonance frequency of the resonance circuit can be manipulated. The inverter INV manipulates the operation frequency in response to a change in the resonance frequency of the resonance circuit, but the inverter INV cannot manipulate the operation frequency within an allowed frequency range when the change is too large. Therefore the switch circuit SWC changes a transmission coil for the sake of decreasing influences from the transmitter's environment. As a result, the operation frequency complies with frequency demands.

Figure 2:
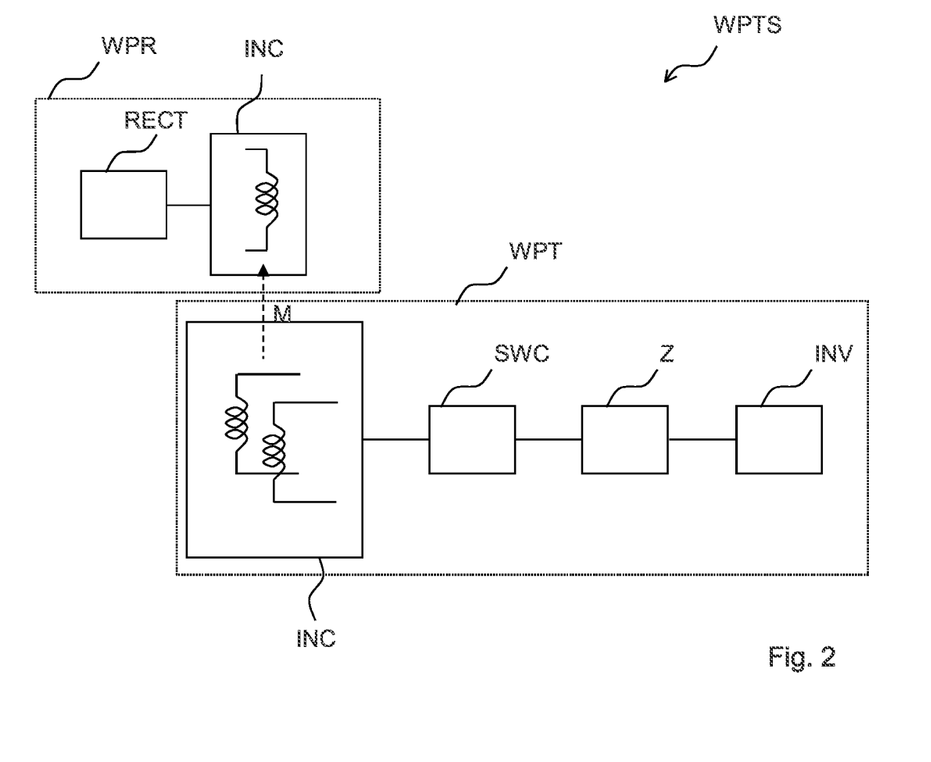
FIG. 2 shows equivalent circuit blocks of basic circuit elements of a wireless power transmission system.

FIG. 2 shows basic circuit elements of a wireless power transmission system WPTS. The system has a wireless power transmitter WPT and a wireless power receiver WPR. The transmission coils of the inductance circuit INC of the transceiver WPT generate a magnetic field M that is received by an inductance circuit INC comprising a reception coil. The received power may be converted to DC power by a rectifier RECT. DC power may be utilized to charge a battery.

Figure 3:
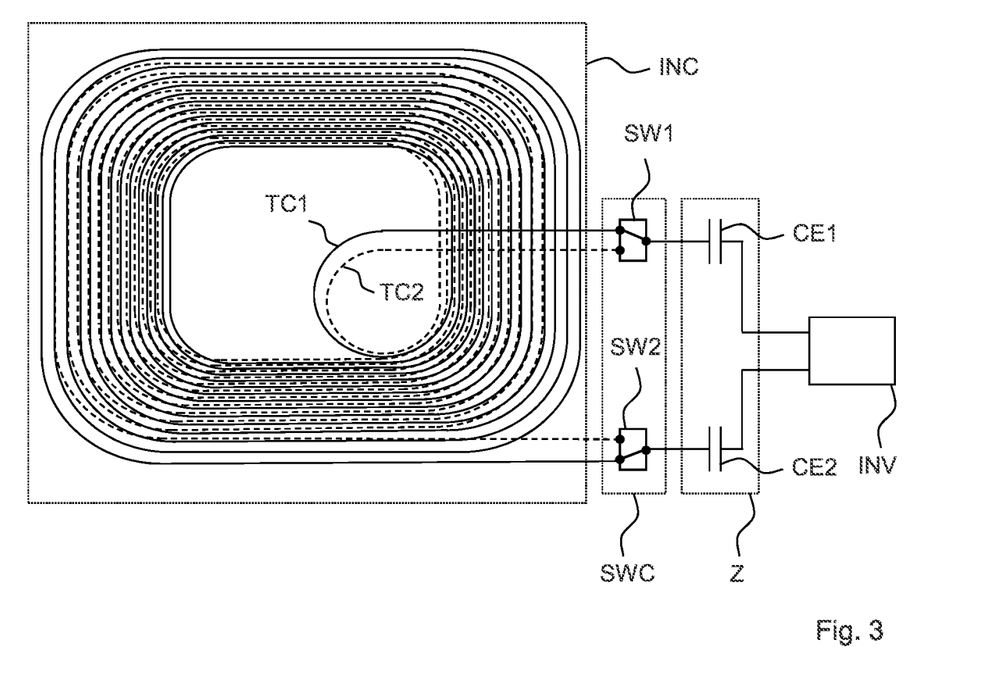
FIG. 3 shows an equivalent circuit diagram of one embodiment with two transmission coils, two switches and two impedance elements.

FIG. 3 shows a possible embodiment where the inductance circuit INC comprises two transmission coils TC1, TC2. Each transmission coil has a first electrode and a second electrode. The transmission coils are wound concentrically and are arranged in essentially the same plane allowing a component with small vertical dimensions. The switch circuit SWC comprises a first switch SW1 and a second switch SW2. The impedance circuit Z has a first capacitive element CE1 and a second capacitive element CE2. The two capacitive elements are coupled to the inverter INV to receive AC power at a frequency of around 85 KHz. The switch circuit SWC allows two modes. In the first operation mode the first switch electrically connects the first capacitive element CE1 to a first electrode of the first transmission coil TC1. Simultaneously the second switch SW2 electrically connects the second capacitive element CE2 to a second electrode of the first transmission coil TC1. AC power is converted into magnetic field energy utilizing the first transmission coil TC1 as antenna. This mode of operation is active in FIG. 3. In another possible mode of operation the first switch SW1 would electrically connect the first capacitive element CE1 to a first electrode of the second transmission coil TC2. Simultaneously the second switch SW2 electrically connects the second capacitive element CE2 to a second electrode of the second transmission coil TC2. Thus, the two modes of operation differ in the used transmission coil. The two transmission coils TC1, TC2 have a different number of turns and a different inductance. By having the option of choosing one of the two transmission coils TC1, TC2 a high degree of transmission efficiency can be obtained while an allowed frequency range is not left although a varied external environment influences the resonance frequency of the resonance circuit.

Figure 4:
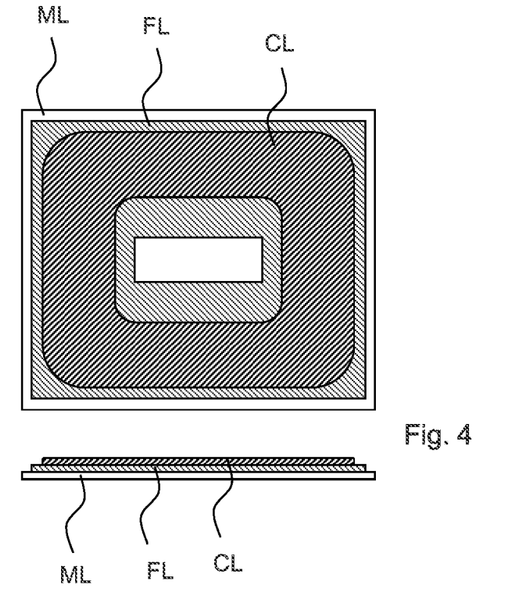
FIG. 4 shows a possible arrangement of layers comprising coils and sheets of the transmitter.

FIG. 4 shows a top view onto the transmission coils comprising a coil layer CL, a ferrite layer FL, and a metal layer ML (top portion of FIG. 4) and a cross section through the transmission coils showing the same layers arranged one above another (bottom portion of FIG. 4). The coil layer CL comprises at least two transmission coils which may be concentrically wound. A ferrite layer FL is arranged between the coil layer CL and the metal layer ML to shape the density of the magnetic field in such a way that only a small amount of magnetic field is placed in the position where the wireless power receiver will not be expected.

Figure 5:
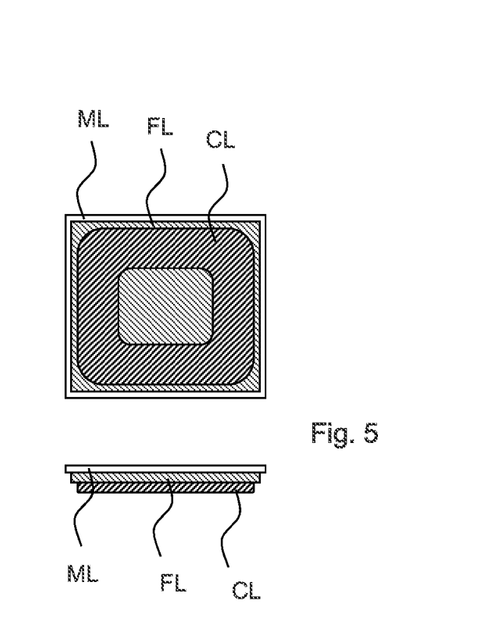
FIG. 5 shows a possible arrangement of layers of coils and sheets of a receiver.

FIG. 5 shows a corresponding construction of the receiver coil comprising a coil layer CL, a ferrite layer FL and a metal layer ML. The ferrite layer FL is arranged between the coil layer CL and the metal layer ML. The coil layer CL is to be arranged above the coil layer of the transmitter to improve transmission efficiency. The ferrite layer FL of the receiver coil improves the transmission efficiency by mainly restricting the magnetic field and its flux through the coil layer CL of the wireless power receiver.

Figure 6:
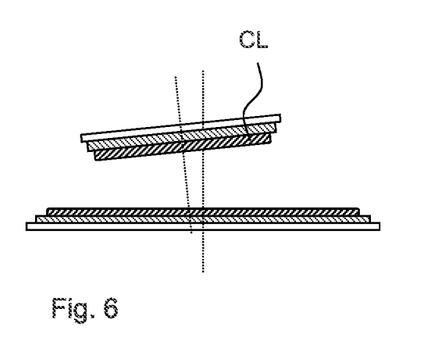
FIG. 6 demonstrates the intrinsic problem of misalignment in wireless power transfer systems.

FIG. 6 shows the basic intrinsic problem of wireless power transfer, i.e., a probable misalignment in orientation of the receiver (top portion) relative to the transmitter (bottom portion). Such a non-perfect alignment would result in a strong frequency shift of the operation frequency. However, by virtue of the switching capabilities and the reality of different operation modes a high power transmission efficiency in an allowed frequency range can be maintained even at quite strong deviations from perfect alignment.

Figure 7:
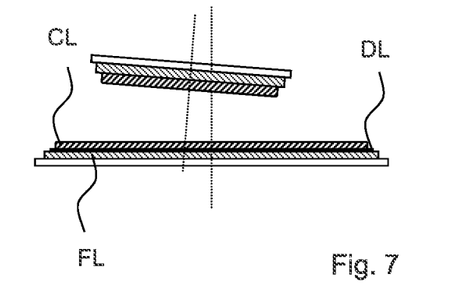
FIG. 7 shows another misaligned system where the transmitter has an additional dielectric layer.

FIG. 7 shows another misaligned system where the antenna module of the power transmitter has a further dielectric layer DL arranged between the coil layer CL and the ferrite layer FL. An additional dielectric layer (not shown in FIG. 7) can be arranged between the ferrite layer FL and the metal layer ML.

Figure 8:
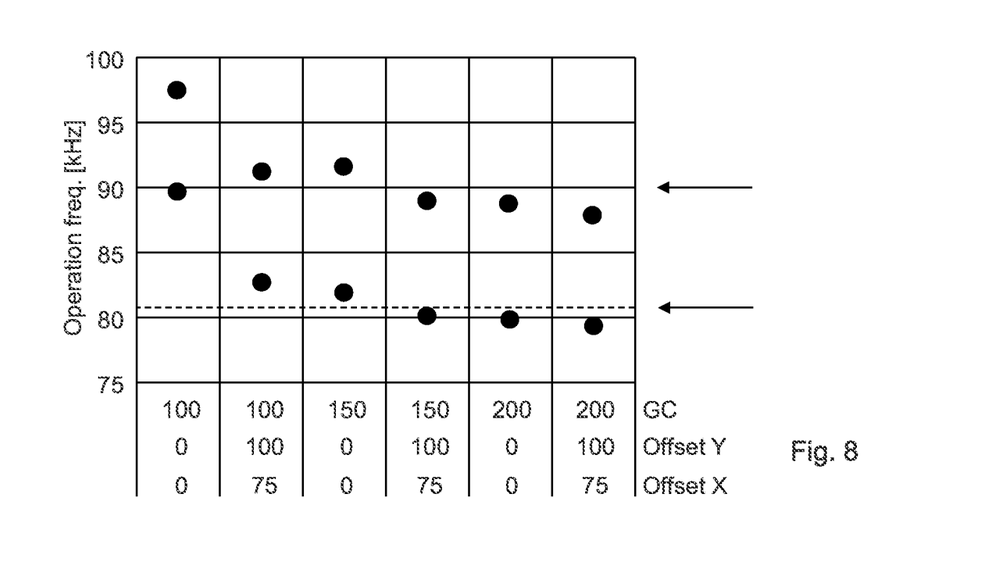
FIG. 8 shows possible frequency shifts to comply with frequency demands.

FIG. 8 shows the effectiveness of the above suggested wireless power transmitter: The arrow indicates the limits of an allowed frequency range (81 kHz to 90 kHz). The ground clearance GC (i.e., the distance between the transmitter and the receiver) is varied for several misaligned configurations between 100 mm and 200 mm. The offset in a Y-direction is chosen to be 0 or 100 mm. The offset in an X-direction is chosen to be 75 or 0 mm. For each of the six shown geometries arranged adjacently at the bottom of diagram are presented. The operation frequency is manipulated so that a prescribed power is transmitted. For example: if the ground clearance is 100 mm and the receiver and the transmitter are horizontally aligned, then one operation frequency is around 89.5 kHz in the first operation mode, and the other operation frequency is at 97.5 kHz in the second operation mode. Then, the first operation mode can be chosen and the resulting operation frequency is within the allowed frequency range.

If ground clearance is 200 mm, the offset in Y-direction is 100 mm and the offset in X-direction is 75 mm (last coil), then the operation frequency of the first operation mode is below the allowed limit. However, the operation frequency of the second operation mode is within the allowed limit. For each of presented alignments of the receiver relative to the transmitter an operation mode can be found that is in compliance with the allowed frequency range although only two transmission coils are utilized exclusively.

Figure 9:
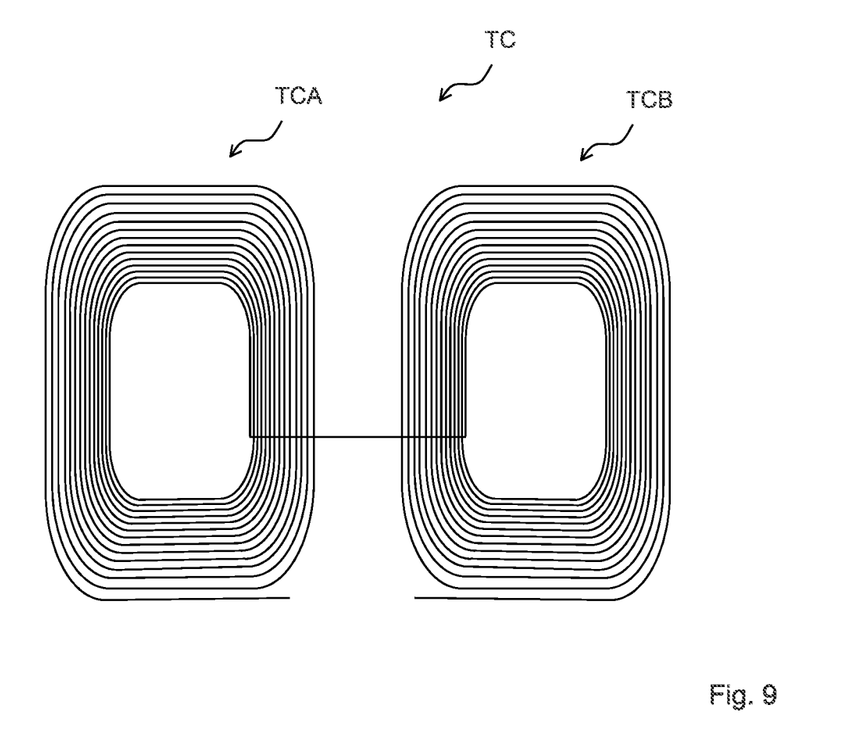
FIG. 9 shows a possible arrangement of the segments of a double-spiral type coil.

FIG. 9 shows a possible arrangement of the elements of a double-spiral type coil. A double-spiral type coil is a possible coil type for a transmission coil TC. A transmission coil TC of the double-spiral type coil type has a first coil segment TCA and a second coil segment TCB. The two coil segments TCA, TCB are electrically connected, preferably in series. In contrast, the two transmission coils TC1, TC2 shown in FIG. 3 are coils of the single-spiral type.

The wireless power transmitter, the wireless transmission system and the method for driving such a system are not limited to the devices and circuits described above and shown in the figures. Transmitters and systems comprising further circuit elements, e.g., further inductance or capacitance elements in the inductance circuit, further transmission coils, further switches or additional components for adaptively controlling the operation frequency are also comprised. Correspondingly, methods for driving such systems comprising further steps, e.g., for testing further transmission coil configurations are also comprised.

The invention claimed is:

1. A wireless power transmitter comprising:
an inverter;
an impedance circuit;
an inductance circuit comprising a first transmission coil and a second transmission coil; and
a switch circuit,
wherein the impedance circuit and the inductance circuit are configured to establish a resonance circuit,
wherein the inverter is configured to provide AC power to the resonance circuit, and
wherein the switch circuit is configured to:
couple the first transmission coil and/or the second transmission coil to the impedance circuit to change a resonance frequency of the resonance circuit,
keep a frequency of the AC power within a prescribed range, and
select the first transmission coil or the second transmission coil to provide the best magnetic coupling to a receiver coil.

2. The wireless power transmitter of claim 1, wherein the first and second transmission coils of the inductance circuit are selected from a single-spiral coil and a double-spiral type coil.

3. The wireless power transmitter of claim 1, wherein the switch circuit is configured to couple the first transmission coil parallel to or in series with the second transmission coil.

4. The wireless power transmitter of claim 1, wherein the switch circuit is configured to couple one transmission coil from the first and the second transmission coils to the impedance circuit while the respective other transmission coil is separated from the impedance circuit.

5. The wireless power transmitter of claim 1,
wherein the switch circuit comprises a first switch and a second switch, and
wherein each of the first transmission coil and the second transmission coil is coupled between the first switch and the second switch.

6. The wireless power transmitter of claim 5,
wherein the impedance circuit comprises a first capacitive element and a second capacitive element, and
wherein the first capacitive element and the second capacitive element are coupled to the first switch and the second switch, respectively.

7. The wireless power transmitter of claim 1,
wherein the switch circuit comprises a first switch and a second switch,
wherein the impedance circuit comprises a first capacitor and a second capacitor,
wherein the switch circuit is configured to electrically connect the first transmission coil in series between the first capacitor and the second capacitor, or
wherein the switch circuit is configured to electrically connect the second transmission coil in series between the first capacitor and the second capacitor.

8. The wireless power transmitter of claim 1,
wherein the impedance circuit is electrically connected between the switch circuit and the inverter, and
wherein the switch circuit is electrically connected between the inductance circuit and the impedance circuit.

9. The wireless power transmitter of claim 1, wherein the first and the second transmission coils are concentrically wound in essentially the same plane.

10. The wireless power transmitter of claim 1, wherein a number of turns of the first transmission coil is larger than a number of turns of the second transmission coil.

11. The wireless power transmitter of claim 1, wherein a wire of the first transmission coil and/or the second transmission coil is a litz wire.

12. The wireless power transmitter of claim 1, wherein a ferrite sheet comprising a ferrite material is arranged below a coil layer comprising the first transmission coil and the second transmission coil.

13. The wireless power transmitter of claim 12, wherein a dielectric sheet comprising a dielectric material is arranged between the coil layer and the ferrite sheet.

14. The wireless power transmitter of claim 13, wherein a metal sheet comprising a metal is arranged below the ferrite sheet.

15. The wireless power transmitter of claim 14, wherein an additional dielectric sheet comprising a dielectric material is arranged between the ferrite sheet and the metal sheet.

16. The wireless power transmitter of claim 1,
wherein the first and second transmission coils of the inductance circuit are selected from a single-spiral coil and a double-spiral type coil, and
wherein the switch circuit is configured to couple the first transmission coil parallel to or in series with the second transmission coil.

17. A wireless power transmission system comprising:
the wireless power transmitter of claim 1; and
a power receiver having a reception coil configured to receive power even though the reception coil and the inductance circuit are not perfectly arranged relative to each other.

18. A method for driving a wireless power transmission system, the method comprising:
selecting a first transmission coil from a plurality of transmission coils;
coupling the first transmission coil to an impedance circuit;
transmitting a first amount of power;
determining at least one transmission parameter selected from a voltage, a current, a phase angle and a resonance frequency;
decoupling the first transmission coil from the impedance circuit;
coupling the first transmission coil and a second transmission coil coupled to the first transmission coil in series to the impedance circuit;
transmitting a second amount of power;
determining at least one transmission parameter selected from a voltage, a current, a phase angle and a resonance frequency;
transmitting an amount of power larger than the first amount and the second amount utilizing a transmission coil with a better transmission parameter selected from a transferred power, a transmission efficiency and an operation frequency from the first transmission coil or the second transmission coil; and
selecting the first transmission coil or the second transmission coil to provide the best magnetic coupling to a receiver coil.

* * * * *